United States Patent Office 3,329,288
Patented July 4, 1967

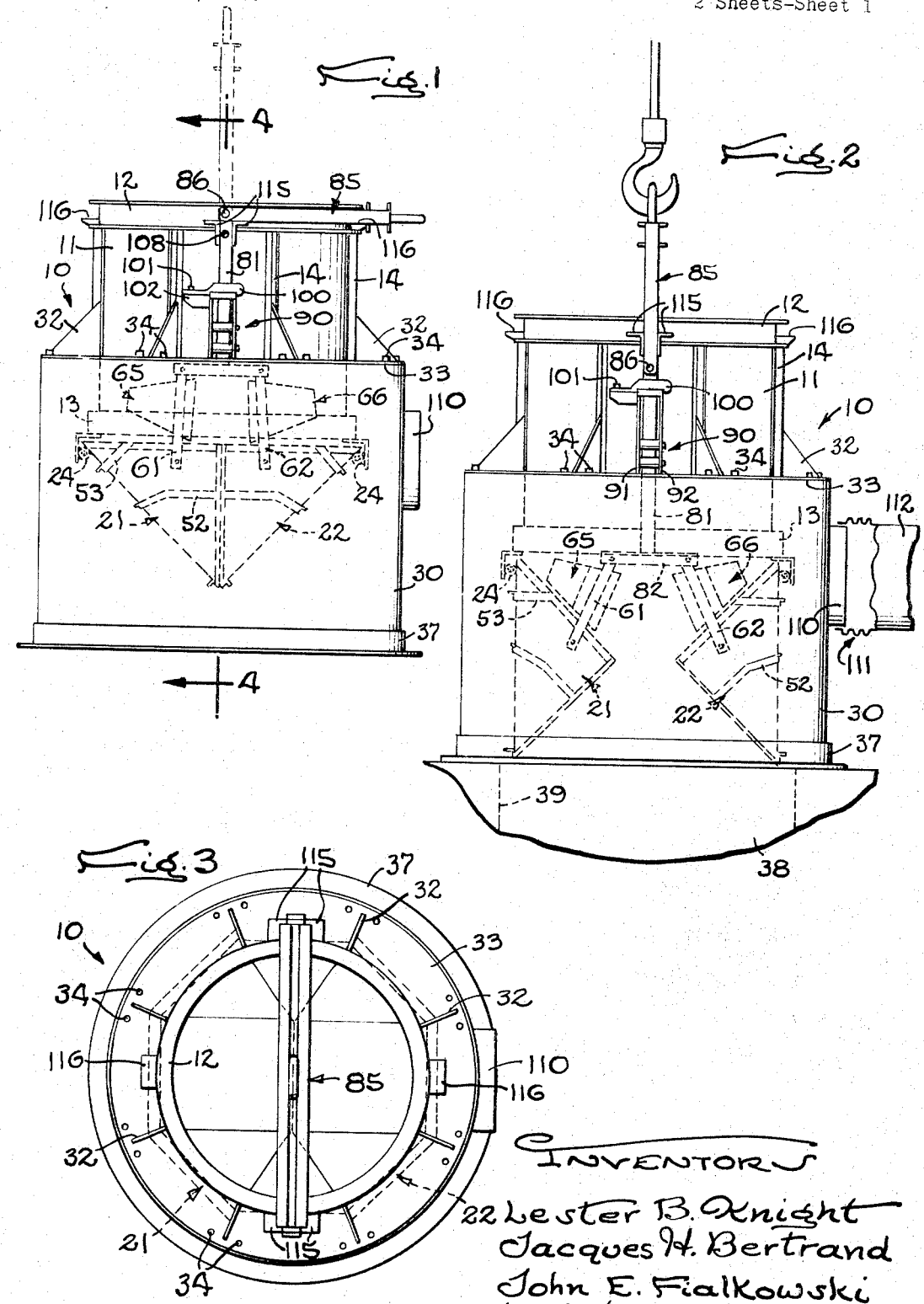

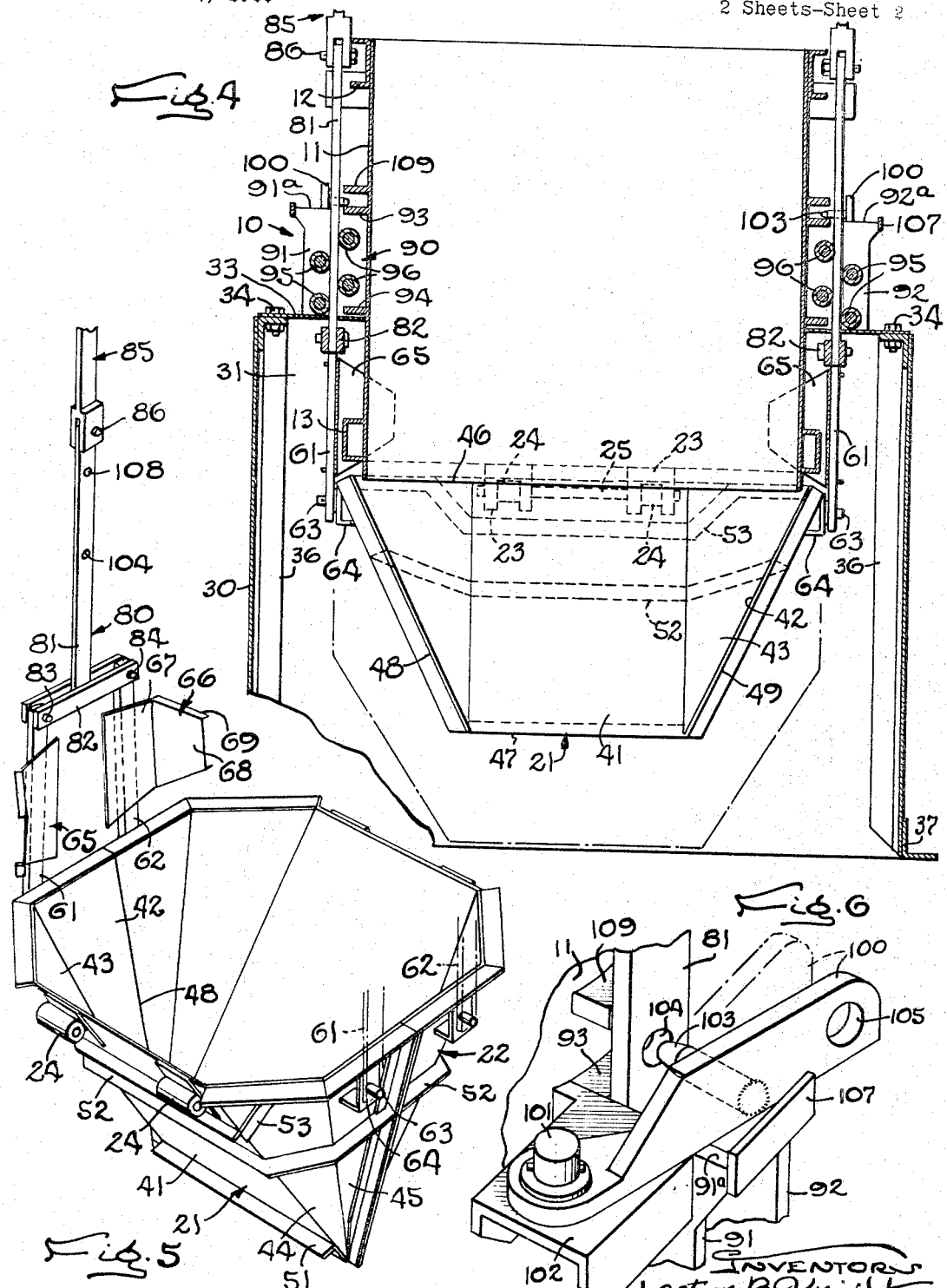

3,329,288
CHARGING BUCKET ASSEMBLY FOR CHARGING CRUCIBLES OR THE LIKE
Lester B. Knight, Winnetka, Jacques H. Bertrand, Western Springs, and John E. Fialkowski, South Holland, Ill., assignors to Lester B. Knight & Associates, Inc., Chicago, Ill., a corporation of Illinois
Filed Oct. 5, 1965, Ser. No. 493,065
12 Claims. (Cl. 214—35)

The present invention relates to charging buckets and more particularly to a hoist-supported bucket which is particularly well suited for transport and placement of a charge of scrap metal in the crucible of an induction furnace.

Induction furnaces have taken on increased importance because of the capability of melting economically, low-grade, low-cost charge material. In an induction furnace coils carrying alternating current surround a cylindrical crucible which is lined with refractory material. The eddy currents which are induced in the charge of scrap metal generate sufficient heat to melt the charge, following which various steps may be taken to purify the charge and to adjust its composition for the making of a variety of ferrous alloys. It has not been generally recognized that the economics of operating an induction furnace are dependent, not only upon the furnace itself and its electrical equipment, but upon the efficiency of construction and operation of the charging bucket. Conventional buckets tend to be unwieldy, difficult to operate, and run risk of damaging the lining of the furnace when the charge is deposited.

It is accordingly an object of the present invention to provide an improved charging bucket assembly which is economical to make and use, which is compact in terms of load capacity per unit volume, which requires minimum head room for given capacity and which, although of light and relatively simple construction, is inherently strong, durable, and long wearing in the face of the rough usage encountered in the furnace operation.

It is more specifically an object of the invention to provide a charging bucket assembly which deposits the charge of metal in a controlled fashion with the charge funneled to the center of the furnace clear of the furnace liner which is susceptible to abrasion and damage by the heavy and frequently sharp edged pieces of the charge. It is more specifically an object of the invention to provide a bucket assembly of a cylindrical shape having a novel gate and shield arrangement which protects the furnace liner against the likelihood of damage from pieces of the charge which may tend to escape sideways through the triangular gap formed between the upper edge of the gate, and its seat, as the gates are opened. In this connection it is an object to provide a bucket assembly in which opening takes place sequentially automatically after the bucket assembly is lowered into a supported position on top of a crucible and in which the gate-operating linkage is so constructed and arranged as to provide precise control with complete freedom from "hang-up" or binding, thus insuring that the load is dumped at a gradual and controlled rate.

It is an object of the invention in one of its aspects to provide a bucket assembly having a provision for disposing of the smoke which accompanies the discharging of a load into the crucible, particularly where the charge is oily or of a low grade containing a high percentage of impurities. Thus it is possible employing bucket assemblies of the present design to maintain the environment cleaner, and the working conditions more pleasant, than where conventional charging techniques are used.

Finally, it is an object to provide a charging bucket assembly having novel means for maintaining the gates closed during the time that the bucket is loaded and opened during hoisting after discharge, with the supporting bail tipped to an out of the way position for maximum access, including a novel latch construction.

Other objects and advantages of the invention will become apparent upon reading the attached detailed description and upon reference to the drawings in which:

FIGURE 1 is a side view of a bucket assembly constructed in accordance with the present invention;

FIG. 2 is a side view similar to FIG. 1 but showing the bucket assembly seated and with the gates in open position;

FIG. 3 is a top view of the assembly shown in FIG. 2;

FIG. 4 is a vertical section taken along the line 4—4 in FIG. 1;

FIG. 5 is a fragmentary perspective of the gates together with a portion of the associated linkage and deflector plates;

FIG. 6 is a fragmentary perspective showing the latch in its engaged and disengaged positions.

While the invention has been described in connection with a preferred embodiment, it will be understood that we do not intend to be limited to the particular embodiment shown but intend, on the contrary, to cover the various alternative and equivalent constructions included within in the spirit and scope of the appended claims.

Turning now to the drawings, there is shown a bucket assembly 10 including a cylindrical body 11. The body has a reinforcing ring 12 about its top edge and a reinforcing ring 13 about its bottom edge and is reinforced by longitudinally extending members 14 of angle iron or the like. For the purpose of enclosing the bottom end of the bucket body a pair of gates 21 and 22 are provided and with the gates being hinged along the outer edges to the bucket periphery. Taking the gate 21 by way of example the hinge includes a pair of depending hinge brackets 23 which are coupled to ferrules 24 by a hinge pin 25. For supporting the bucket body on the top of a crucible for discharge of the load, the assembly includes a cylindrical supporting shroud 30 surrounding the lower end of the bucket body and the gates and of a larger radius so as to define an annular space 31 between them. To secure the shroud to the bucket body, the body has a set of radially projecting web plates 32 of triangular shape which are welded or otherwise secured to the longitudinally enforcing members 14 and to an annular "filler" plate 33 which is supported on the upper edge of the shroud. For fastening the filler plate and shroud together, bolts 34 are passed through the plate and the upper edge of the shroud. The shroud is strengthened in the axial direction by a plurality of spaced reinforcing members 36 of angle iron or the like. At the foot of the shroud a reinforcing ring 37, also made of angle iron, provides a relatively wide engaging surface for seating on the top of a crucible. A typical crucible, indicated at 38 has a liner 39 of refractory material.

In accordance with one of the features of the present invention the gates 21, 22 which are identical with one another, are of semi-frustoconical shape, conforming generally to the outline of the bucket body along the upper edge and having a substantially reduced dimension along the lower edge or lip.

Thus, taking the gate 21 by way of example, the conical shape is approximated by bending a sheet of flat stock to define a side panel 41 of rectangular outline bounded by triangularly shaped panels 42, 43, 44, and 45. This produces an upper edge or throat 46 of ample dimensions tapering down to a lip 47 and tapered side edges 48, 49. The mating edges 47, 48, 49 on the two gates present a trapezoidal profile as shown in FIG. 4. Reinforcement is provided by a piece of angle iron 51 running horizontally along the lip of the gate and by two additional belts of reinforcement 52, 53 at a higher level. Since the mating gate 22 is identical, corresponding reference numerals have been used.

The term "semi-frustoconical" as used herein is employed in either of two senses. In the first place, rather than being smoothly curved the gates are more simply formed by bending into triangular panels. A gate thus formed approximates a curved surface and is functionally equivalent thereto; indeed, if desired, the gates may be rolled into curved shape without departing from the invention. Secondly it is to be noted that while a cross section taken through the gates along the line of mating is trapezoidal, which is characteristic of a frustoconical section, a transverse section taken at right angles thereto is more nearly triangular which is characteristic of a cone. This combination of a conical and frustoconical section along rectangular axes is found to provide secure closure accompanied by controlled discharge of a load of scrap metal or the like centrally within the crucible without risk of the material "hanging up" as the gates are opened. It will be noted in FIG. 2 that when the gates are fully opened the central panels on the gates are directed substantially straight down, parallel to the bucket axis, so as to allow minimum interference with the complete discharge of the bucket while the triangular panels, formed by bending on each side of the central panels, conform generally to the inner cylindrical surface of the shroud.

For the purpose of operating the gates, each gate is engaged by vertically movable drop links which are pinned, at their lower ends, to the upper edge of the gate along a horizontal axis which is spaced inwardly from the hinge axis. Moreover, to confine the discharged load and to prevent side-spill between the upper edges of the gates and the lower edge of the bucket body, each of the drop links is provided a deflector plate which is moved, with its associated drop link, from a nested position alongside of the bucket body when the gates are in closed position to a position to span the gap produced when the gate is opened. Thus, as shown on the drawings, we provide for the gate 21 a set of drop links 61 and for the gate 22 a set of drop links 62. Taking the drop link 61 by way of example, they engaged, at their lower ends, respective pins 63 which are in alinement with one another, each pin being mounted upon a bracket 64 which is welded or otherwise secured to the side of the gate. Mounted upon the drop links 61 and secured thereto, for example, by welding, are deflector plates 65. A second set of plates 66, being a mirror image of the first, are mounted upon the drop links 62. Taking one of the deflector plates 66 by way of example, as shown in FIG. 5, the plate is centrally bent at a shallow angle to form two panels 67, 68, the panel 68 having a reinforcement 69 extending along its edge. The bent configuration insures close nesting about the bucket body when the gates are closed and conformity to the gate edge when the gates are open. For the purpose of more nearly conforming to the triangular profile of the gap, each of the deflector plates preferably has a tapered outline as brought out in FIG. 2. With all four of the deflector plates lowered into the gap as the gates are opened, it will be apparent that any tendency for the scrap metal to spill out of the sides of the gates, particularly near the region of the hinge, is avoided.

In accordance with one of the features of the invention operating members are provided on the opposite sides of the bucket body and extending into the shroud for engaging the upper ends of the drop links 61, 62 and operated by a floating bail for maintaining the gates closed during transport and for causing the gates to open sequentially and automatically when the bucket assembly is lowered for shroud-engagement on its supporting crucible. More specifically in accordance with the present invention we provide gate operators in the form of inverted T-shaped members guided for reciprocating movement along the sides of the bucket body, with the lower ends thereof being connected to the drop links and with the upper ends being pivotally connected to a supporting bail. As is shown in FIG. 5, one of the operating or T members indicated at 80 is made up of a vertical portion 81 and a horizontal portion 82 having pin connections 83, 84 with the associated drop links 61, 62. At its upper end a supporting bail, indicated at 85, is pivotally connected to the operating member by a pin 86.

For guiding the vertical portion 81 of the operating member, a guide bracket assembly 90 is provided, formed of a pair of spaced plates 91, 92 having spacer blocks 93, 94 between them, the plates and blocks being securely welded to the side of the bucket body. To reduce friction, the outer surface of the member 80 is engaged by a pair of rollers 95 and the inner surface is engaged by a pair of rollers 96 which are journalled between the bracket plates and vertically offset from one another. The spacing of the bracket plates is such as to confine the operating member against edgewise movement. This combination insures guidance along a straight line path so that the gates are acted upon symmetrically and free of any tendency towards sticking or binding.

For the purpose of latching the operating member 80 in an upraised position to maintain the gates closed, a laterally movable latch member is provided having a projection which registers with an opening in the operating member. Thus referring to FIGS. 1, 4, and 6, we provide a laterally swingable latch member 100 which is pivoted at 101 to an arm 102 welded to the side of the assembly 90. Mounted on the body of the latch member is a pin 103 which engages a registering opening 104 in the member 80. A hole 105 at the end of the latch member may be conveniently engaged by a latch operating tool for example, a wand having a hook at the end thereof. For supporting the latch member as it is moved from its outer position to its inward engaging position, the latch is preferably located so that its lower edge rides on the upper edges 91a, 92a of the plates 91 and 92, with the inner end of the pin 103 supported in its inserted position, by the spacer block 93. Because of the solid support provided for the latch, the latch itself may be made of relatively light construction without any sacrifice in reliability. To limit the degree of outward swing of the latch, a stop bar 107 is secured to the outer edges of the plates 91, 92 and projecting above the level of the supporting surface thereon.

In order to utilize the same latch to hold the gates in open position, the operating member 80 is provided with a second opening 108 which registers with the pin 103 when the gates are swung into the position shown in FIG. 2. Overswing of the gates is prevented by use of a stop bar 109 spaced directly above the bar 93, the two bars thus acting together to hold the pin 103 captive while providing sufficient clearance between the pin and the upper stop bar so that "bottoming" occurs at the edges of the gates, rather than at the member 109, when upward force is applied to the bail.

While the means for supporting and latching the operating member 80 has been described in connection with the mechanism at one side of the bucket, it will be understood that an identical assembly is provided at the other side of the bucket and corresponding numerals have therefore been used to denote corresponding parts.

For the purpose of exhausting the smoke and dust which usually accompanies the deposition of the charge of charge into the crucible, depending upon the degree of oiliness and amount of impurities, and for insuring against the escape of such material vertically through the bucket due to "chimney" effect, we provide an exhaust duct 110 at one side of the supporting shroud 30 to which is connected a flexible coupling 111 at the end of a vacuum line 112. The coupling 111 is preferably attached after the bucket assembly has been placed above the crucible and before releasing the gates. The vacuum line 112 may be connected to an induction fan or to a plenum chamber which exerts a sufficient vacuum, on the order of ½ inch of water, so that air is drawn downwardly through the exiting scrap metal as well as upwardly from the crucible. After the charge has been dumped into the crucible, the bucket assembly may be raised a few inches for insertion of a cover plate over the crucible. It will be apparent by use of the bucket and procedure it is possible to maintain the surroundings cleaner and more pleasant than it has been possible in the past.

In accordance with one of the more detailed aspects of the invention means are provided for guiding the operating members and bail in the region of the bail pivots 86 and so arranged that the bail pivots lie slightly above the guiding means when the bail is drawn to its uppermost position to close the gates, thus permitting the bail to be swung laterally into a folded-over position to maintain the gates locked while the bucket is being loaded. Thus, straddling the vertical portions 81 of each of the operating members we provide upper guides 115 (see FIGS. 1 and 2). When the gates are open, as shown in FIG. 2, these guides straddle the bail and keep the same in vertical position. However, when lifting force is applied to the bail accompanied by movement of the operating members 80 and closure of the gates, the bail pivots 86 are moved above the level of the guides 115, thereby permitting the bails to be swung or folded over sideways into the position shown in FIG. 1 in which a bail stop surface 116 is engaged to hold the bail in horizontal position. In such a position the lower end of the bail overlies the guide members 115 to prevent endwise movement of the members 80, thereby maintaining the gates closed and permitting the latches 100 to be easily swung into locking position.

While the operation of our improved bucket assembly will be apparent from the foregoing description, it may be helpful to summarize it briefly: The bucket assembly is transported by crane to a loading position, the weight of the assembly being sufficient so that the bail reaction force, acting upon the operating members 80, maintains the gates closed. At the loading position the assembly is lowered and the crane hook is swung sideways to fold the bail into horizontal position as shown in FIG. 1. This temporarily locks the gates in closed position for manual closing of the latches and enables the entire upper end of the bucket to be accessible for loading.

Following the loading the bail is again engaged by the crane hook and the bucket assembly is transported from the loading station to the induction furnace. With the assembly centered over the crucible it is lowered until the supporting shroud 30 rests upon the upper edge of the crucible as shown in FIG. 2, with the venting connection on the shroud 110 alined with the vacuum line 112. The coupling 111 is extended to close the gap and the latches 100 are released. Following this, the bail is gradually lowered by the crane hook accompanied by opening of the gates. As the gates open, the deflector plates 65, 66 on the drop links are lowered to close the gap which exists above the gates to prevent side-spill of the charge metal being discharged. Because of the semi-frustoconical shape of the gates and because of the deflector plates the charge tends to be deposited at the center of the crucible safely away from the refractory crucible liner thus preventing the liner from being abraded or damaged by the heavy and jagged pieces of metal. Since the gate operating members 80 are smoothly guided in their downward movement, the gates are opened symmetrically with complete freedom from binding or jamming and with complete absence of any "hang-up" of material within the buckets. Because of the induced vacuum, any discharge of reaction products into the room by reason of "chimney" effect within the bucket is prevented and all airborne foreign matter is safely withdrawn into the vacuum system.

Following discharge of a load into the crucible, the crane hook is raised to close the gates and the vacuum coupling 111 is disengaged. The bucket assembly may then be raised a few inches from the crucible to permit a crucible cover to be slid into place, following which the bucket assembly may be transported back to the loading station and the process repeated. A single bucket of the present consruction may be used to service a number of different induction furnaces.

As an alternative in the operation, after the metal is discharged from the bucket the pin 103 may be inserted into the opening 108 to lock the gates in their open position. Thus when the hoist raises the bucket, the gates will not close. This is important if the cold charge is heaped so high in the crucible that the closing of the gates of the bucket would "grab" a part of the charge. When the bucket clears the crucible using this mode of operation, it is set down so that pin 103 may be released from hole 108 and the sequence repeated.

In the following claims the term "cylindrical" will be understood to mean a shape which is truly cylindrical or a shape which approaches a cylinder and which is formed, for example, by a succession of bends. Also in the following claims it will be understood that the term "engage," as applied to the relation between the upper edges of the gates and the lower edge of the bucket body has to do with the cooperation between the adjacent members to perform the intended function and does not necessarily imply actual seating of the members against one another.

We claim as our invention:

1. In a bucket assembly for loading the crucible of an induction furnace or the like, the combination comprising a cylindrical body, a pair of semi-frustoconical gates at the lower end of the body and having horizontal hinge connections therewith, said gates movable from a closed position in which the gates engage one another and the lower edge of the body and an open position in which the gates are spread outwardly and downwardly, a cylindrical supporting shroud secured concentrically to the body and surrounding the gates, gate operating members each having a vertical portion which extends downwardly along the opposite sides of the body and having their lower ends coupled to the gates, means for mounting the vertical portion of the operating members for straight line sliding movement alongside the body, and a bail having its ends pivotally connected to the upper ends of the operating members so that the bail maintains an upwardly directed force on the operating members to maintain the gates closed during the transport of the assembly while allowing the gates to open under the force of gravity as the bail is lowered following seating of the shroud upon a crucible.

2. The combination according to claim 1, each of the operating members having an associated latch connected to the bucket body and movable laterally into interfering engagement with the vertical portion thereof to maintain the operating members in their gate closing positions when the bail is released incident to loading of the bucket.

3. A bucket assembly for loading the crucible of an induction furnace or the like, the combination comprising a cylindrical body, a pair of gates at the lower end of the body and having horizontal hinge connections therewith, said gates being movable from a closed position in which the gates engage one another and the lower edge of the body and an open position in which the gates are spread outwardly and downwardly, a supporting shroud of cylindrical shape and circling the lower portion of the bucket and extending below the gates for seating on the top of a crucible, said shroud being of greater diameter than the bucket body, a bail at the upper end of the bucket for supporting the same, and a linkage interposed between the bail and the gates so that the gates are closed by bail reaction under conditions of transport and opened by gravity upon releasing the force on the bail when the shroud is seated on the crucible, said gates being of semi-frustoconical shape so that the mating edges thereof lie in the locus of a trapezoid while a section taken transversely thereto is in the shape of a triangle so that the discharge of the bucket load tends to take place centrally of the bucket axis and safely spaced from the liner of the crucible.

4. In a bucket assembly for loading the crucible of an induction furnace or the like, the combination comprising a cylindrical body, a pair of gates at the lower end of the body and having horizontal hinge connections therewith, said gates being movable from a closed position in which the gates engage one another and the lower end of the body and an open position in which the gates are spread outwardly and downwardly, a supporting shroud of cylindrical shape secured to the lower portion of the bucket and surrounding the gates for seating on top of a crucible, said shroud being of greater diameter than the bucket body, a bail for supporting the upper end of the bucket body, and means associated therewith for operating the gates, each of said gates being formed of a generally rectangular panel flanked by triangular end panels bent to define when closed a semi-frustoconical form having an upper edge which generally conforms to the outline of the bucket body and which as the gates are opened tends to direct the bucket contents to the center of the crucible, a bail for supporting the upper end of the bucket body, and means including deflector plates for bridging the gap which exists above the gates when the latter are opened, thereby to minimize side-spill of the discharged load against the liner of the crucible.

5. In a bucket assembly for loading the crucible of an induction furnace or the like, the combination comprising a cylindrical body, a pair of gates at the lower end of the body and having horizontal hinge connections therewith, said gates being movable from a closed position in which the gates engage one another and the lower edge of the body and an open position in which the gates are spread downwardly from the body and outwardly from one another, a supporting shroud of cylindrical shape securing the lower portion of the bucket and surrounding the gates for seating on the top of a crucible, said shroud being of greater diameter than the bucket body and having an annular filler piece at its upper end for enclosing the space between the shroud and the body, drop links connected in pairs to the respective sides of the gates, an inverted T member extending through the filler piece on each side of the bucket for connection of the lower ends thereof to the pairs of drop links, a suspension bail pivoted to the upper ends of the respective T members so that the gates are maintained closed by the reaction force of the bucket assembly on the bail and opened by lowering of the assembly into a shroud-supported position on the crucible, and a latch for maintaining the gates closed independently of the force on the bail during loading of the bucket assembly.

6. In a bucket assembly for loading the crucible of an induction furnace or the like, the combination comprising a cylindrical body, a pair of gates at the lower end of the body and having horizontal hinge connections therewith, said gates being movable from a closed position in which the gates engage one another and the lower edge of the body and an open position in which the gates are spread downwardly and outwardly from one another, a cylindrical supporting shroud secured concentrically to the body and surrounding the gates, pairs of drop links pinned to the gates along pin axes which are spaced from the axes of the associated hinge connections, a floating bail, means for coupling the bail to the drop links so that the gates are maintained closed by the reaction force of the bucket assembly on the bail and opened by lowering the assembly into a shroud-supported position on top of a crucible, and deflector plates secured to the drop links for movement with the links from a nested position alongside the body when the gates are closed to a spanning position between the gates and the lower edge of the body when the gates are open thereby to minimize side-spill of the discharged load against the liner of the crucible.

7. In a bucket assembly for loading the crucible of an induction furnace or the like, the combination comprising a cylindrical body, a pair of gates at the lower end of the body and having horizontal hinge connections therewith, said gates being movable from a closed position in which the gates engage one another and the lower edge of the body and an open position in which the gates are spread downwardly and outwardly from one another, a cylindrical supporting shroud secured concentrically to the body and surrounding the gates, pairs of drop links pinned to the gates along pin axes which are spaced from the axes of the associated hinge connections, a floating bail, means for coupling the bail to the drop links so that the gates are maintained closed by the reaction force of the bucket assembly on the bail and opened by lowering the assembly into a shroud-supported position on top of a crucible, and deflector plates secured to the respective drop links, said deflector plates being of bent configuration so as to occupy a nested position alongside the body when the gates are closed and having a tapered profile to span the gap between the upper edges of the gates and the lower edge of the body when the gates are open thereby to minimize side-spill of the discharged load against the liner of the crucible.

8. In a bucket assembly for loading the crucible of an induction furnace or the like, the combination comprising a cylindrical body, a pair of gates at the lower end of the body and having horizontal hinge connections therewith, said gates being movable from a closed position in which the gates engage one another and the lower edge of the body and an open position in which the gates are spread outwardly and downwardly, a cylindrical supporting shroud secured concentrically to the body and surrounding the gates, drop links connected in pairs to the respective sides of the gates, inverted T members each having a vertical portion which extends downwardly along the opposite sides of the body and a horizontal portion having its ends pinned to adjacent ones of the drop links, means for mounting the vertical portion of the T members for straight line sliding movement alongside the body and a bail having its ends pivotally connected to the upper ends of the T members so that the bail maintains an upwardly directed force on the T members to maintain the gates closed during the transport of the assembly while allowing the gates to open under the force of gravity as the bail is lowered following seating of the shroud upon a crucible.

9. In a bucket assembly for loading the crucible of an induction furnace or the like, the combination comprising a cylindrical body, a pair of semi-frustoconical gates at the lower end of the body and having horizontal hinge connections therewith, said gates being movable from a closed position in which the gates engage one another and upon the lower edge of the body and an open position in which the gates are spread outwardly and downwardly, a cylindrical supporting shroud secured concentrically to the body and depending therefrom to surround the gates, a pair of gate operating members extending vertically on opposite sides of the body and into the shroud, a bucket suspending bail spanning the upper ends of the gate operating members, linkage at the lower ends of the gate operating members for coupling the same to the gates so that when the bucket is supported by the bail an upward force is applied to the gate operating members for holding the gates in the closed position and so that when the bucket assemby is lowered into a shroud-supported position, the gates are gravity-opened for discharge of the load, each of said gate operating members having a latch supported on the bucket body and movable inwardly and outwardly with respect to the associated gate operating member, each of said latches having a lateral projection receivable in a registering opening in the associated operating member to maintain such member in its gate closing position when the force on the bail is released incident to loading of the bucket.

10. In a bucket assembly for loading the crucible of an induction furnace or the like, the combination comprising a cylindrical body, a pair of semi-frustoconical gates at the lower end of the body and having horizontal hinge connections therewith, said gates being movable from a closed position in which the gates engage one another and upon the lower edge of the body and an open position in which the gates are spread outwardly and downwardly, a cylindrical supporting shroud secured concentrically to the body and depending therefrom to surround the gates, a pair of gate operating members extending vertically on opposite sides of the bucket body and extending into the shroud, a bucket suspending bail pinned to the upper ends of the gate operating members, linkage at the lower ends of the gate operating members for coupling the same to the gates so that when the bucket is supported by the bail an upward force is applied to the gate operating members to maintain the gates in closed position, a guiding bracket assembly secured to each side of the bucket body, said bracket assembly having a plurality of guide rollers for engaging the associated operating member, a latch member overlying the bracket assembly, each of said latch members having a lateral projection receivable in a registering opening in the operating member so that the downward force exerted by the gates upon the operating members is transmitted to the bracket assembly thereby to maintain the gates in closed position when the bail is released incident to loading of the bucket.

11. In a bucket assembly for loading the crucible of an induction furnace or the like, the combination comprising, a cylindrical body, gates at the lower end of the body, a cylindrical supporting shroud concentrically secured to the lower end of the body and surrounding the gate, gate operating members extending vertically on opposite sides of the bucket assembly and projecting into the shroud for connection to the gates so that upon upward movement of the operating members the gates are closed and so that upon downward movement of the operating members the gates are opened, means for guiding the gate operating members including an upper guide member, a bail having a pivot connection with the upper ends of the respective operating members, said pivot connections being so located with respect to the upper guide member as to be slightly above the guide members when the gates are closed permitting the bail to be swung sideways into horizontal position overlying the upper guide members thereby locking the gates in closed position as long as the bail is horizontal.

12. In a bucket assembly for loading the crucible of an induction furnace comprising, in combination, a cylindrical body, a pair of semi-frustoconical gates at the lower end of the bucket body having horizontal hinge connections therewith, bucket operating members on the opposite sides of the bucket for opening and closing the gates, a bail for supporting the bucket body, a cylindrical supporting shroud concentrically secured to the bucket body and extending downwardly therefrom surrounding said gates, said cylindrical shroud being larger in diameter than the bucket body and having an annular filler piece for sealing the space between the upper edge of the shroud and the wall of the bucket body, a venting connection on the wall of the shroud having means for connecting the same to a vacuum line when the shroud is seated on a crucible and during the time that the gates are opened so that a downward draft is established in the bucket body preventing escape of airborne reaction products including dust and the like from the crucible into the atmosphere and which may tend to escape by reason of chimney action through the bucket body at the time the gates are opened.

References Cited

UNITED STATES PATENTS

| | | | |
|---|---|---|---|
| 992,724 | 5/1911 | Lockwood | 294—71 |
| 1,474,707 | 11/1923 | Crowl | 294—71 |
| 2,746,787 | 5/1956 | Bottcher | 294—71 |

GERALD M. FORLENZA, *Primary Examiner.*

R. G. SHERIDAN, *Assistant Examiner.*